United States Patent [19]
Takada

[11] 3,897,105
[45] July 29, 1975

[54] VEHICLE SAFETY BELT SYSTEM
[75] Inventor: Takezo Takada, Hikone, Japan
[73] Assignee: Takata Kojyo Co., Ltd., Tokyo, Japan
[22] Filed: Apr. 4, 1973
[21] Appl. No.: 347,986

[30] Foreign Application Priority Data
Apr. 17, 1972 Japan.............................. 47-37810

[52] U.S. Cl................................ 297/389; 297/216
[51] Int. Cl.².......................................... A62B 35/00
[58] Field of Search .......... 297/389, 388, 385, 216; 280/150 SB

[56] References Cited
UNITED STATES PATENTS

| | | | |
|---|---|---|---|
| 3,220,747 | 11/1965 | Marion | 280/150 SB |
| 3,329,464 | 7/1967 | Barwood et al. | 297/389 |
| 3,418,021 | 12/1968 | Lewis | 297/389 X |
| 3,439,932 | 4/1969 | Lewis et al. | 280/150 SB |
| 3,442,529 | 5/1969 | Lewis et al. | 297/388 X |
| 3,456,896 | 7/1969 | Fisher | 297/388 X |
| 3,471,197 | 10/1969 | Ely | 297/216 X |
| 3,584,896 | 6/1971 | Jantzen | 297/388 |
| 3,639,000 | 2/1972 | Keltner | 297/389 X |
| 3,709,558 | 1/1973 | Jakob | 297/389 |

Primary Examiner—James T. McCall
Attorney, Agent, or Firm—Wolder & Gross

[57] ABSTRACT

A vehicle safety belt system includes a seat having a seat portion and a back portion provided with openings proximate its lower corners and at its upper side sections. Guide rollers are mounted on support members in the rear of the seat back adjacent each opening and a belt extends from the rear around each guide roller and forwardly through a corresponding opening, the inner end of each belt being anchored in the seat back at points remote from a corresponding guide roller either directly or through a belt take-up reel which may be automatically locked under inertia switch control. The belts extending through the bottom openings define lap belts and are provided with a tongue and buckle and the belts extending through the upper openings define shoulder belts and their front ends are connected to respective end portions of the lap belts. The belts extend in opposite directions from each roller.

7 Claims, 3 Drawing Figures

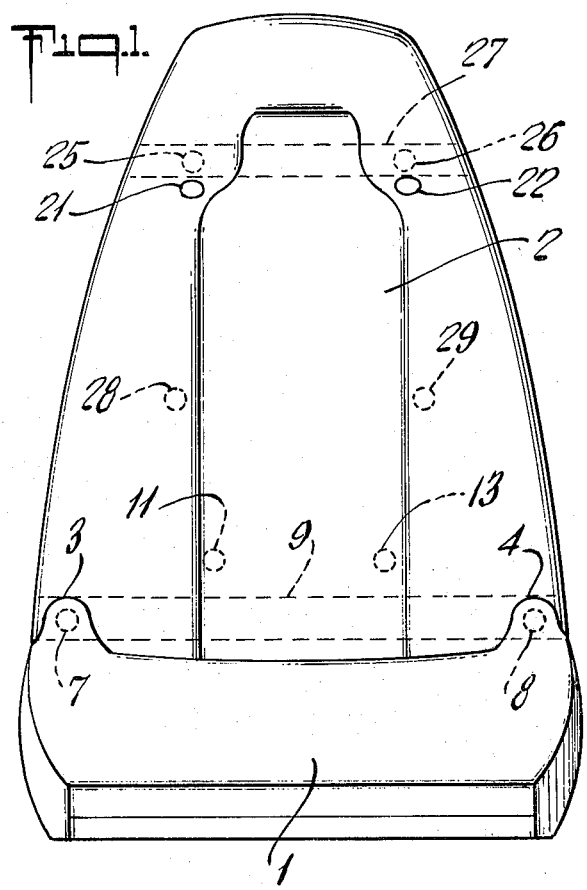
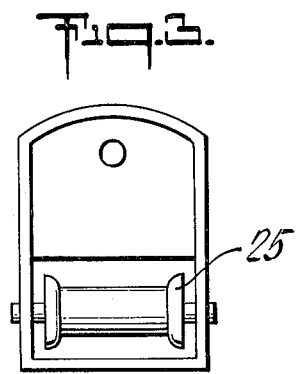
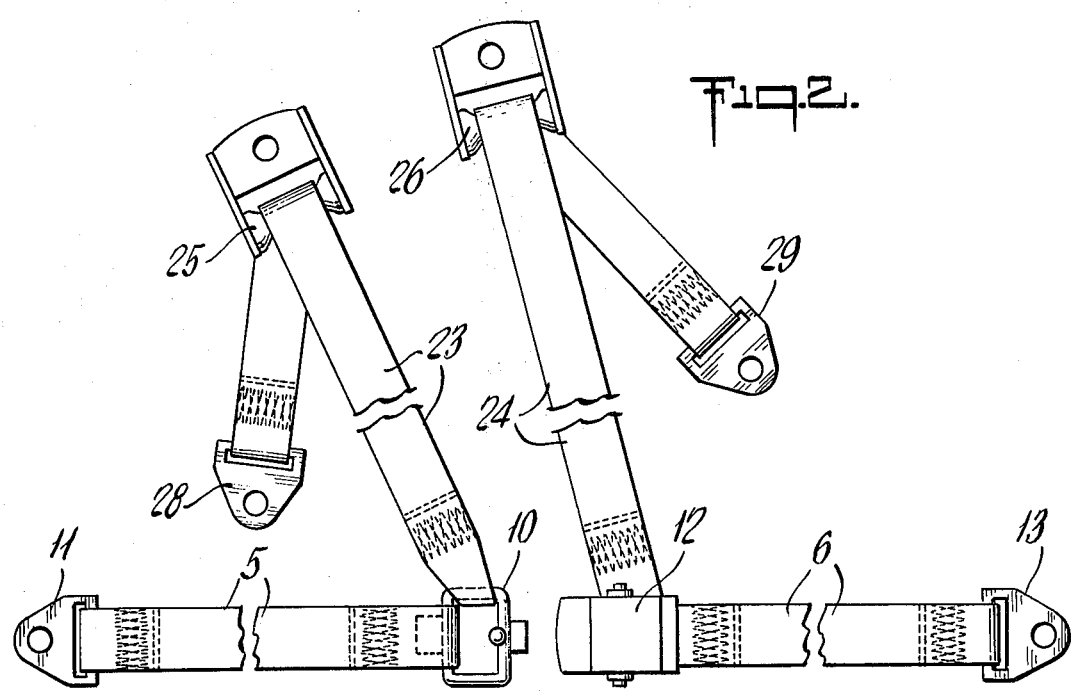

VEHICLE SAFETY BELT SYSTEM

BACKGROUND OF THE INVENTION

The present invention relates generally to improvements in vehicle safety devices and it relates particularly to an improved vehicle passenger safety belt system.

Many types of safety belt systems for restraining the occupants of seats so that in the event of accident, injury to occupant is prevented or minimized, have been employed and proposed, but these possess numerous drawbacks and disadvantages. It is highly desirable that a lap or waist belt, as well as one or a pair of shoulder belts be associated with each vehicle seat and that safety belts not only restrain the occupant from being rejected from the seat, but that the restraint itself should not result in injury to the passenger, furthermore the belt system should be of such a nature as to accommodate occupants of different sizes, physical builds and ages. The safety belt arrangements heretofore available vary greatly in their response to different types of occupants, are highly inconvenient, are awkward and highly unattractive devices and otherwise leave much to be desired.

SUMMARY OF THE INVENTION

It is a principal object of the present invention to provide an improved vehicle occupant safety device.

Another object of the present invention is to provide an improved vehicle safety belt system.

Still another object of the present invention is to provide an improved vehicle seat occupant lap and shoulder safety belt system.

A further object of the present invention is to provide an improved mounting system for vehicle passenger safety belts.

Still a further object of the present invention is to provide an improved safety belt system of the above nature characterized by its optimum response properties, reliability, convenience, attractive appearance and great versatility and adaptability.

The above and other objects of the present invention will become apparent from a reading of the following description taken in conjunction with the accompanying drawings which illustrate a preferred embodiment thereof.

In a sense the present invention contemplates the provision of a vehicle safety belt system in association with a vehicle seat in which there is provided a guide roller mounted on the seat and a safety belt is anchored at one end at a point on the seat remote from the guide roller, either directly or by way of a belt retractor reel and extends about the roller to the front of the seat and is provided at its front end with separable fastening means.

In accordance with the preferred form of the improved safety belt system, the back of the seat is provided with mounting members and has openings formed in its front face at its lower corners and at opposite sides at about shoulder height. A bracket supported guide roller is hung from the mounting members within the seat back proximate each of the openings. A shoulder harness defining belt extends through each of the upper openings around an adjacent guide roller and downwardly to a remote anchoring point within the seat back. A lap belt extends through each of the bottom openings about a corresponding guide roller and thence to a transversely inwardly disposed anchor point. The front ends of the lap belts are provided with a mating tongue and buckle and the front end of each of the harness belts is connected to the front end of a respective lap belt. Each of the belts, as it passes about the respective guide roll traverses similar paths on opposite sides of the guide roller, reversing in direction about the guide roller, that is, each harness belt in opposite sides of the corresponding guide rollers extends approximately vertically and each harness belt extends somewhat inclined to the horizontal to a small degree. Moreover, while a pair of harness belts are preferably provided, a single shoulder belt may be employed instead, with the front end thereof connected to a front end of a single lap belt which is separably connected or buckled to an opposite side of the seat in accordance with the conventional form of three point shoulder and lap belt system.

An important advantage which is achieved by the present improved safety belt system resides in that not only is there increased impulse energy absorption by the safety belt web, but this impulse energy absorption is greatly enhanced by reason of the cushion effect afforded by the manner in which the belt web is supported by the guide rollers mounted behind the seat back and contributes to the absorption of the impulsive force applied to the occupant and functions to improve the occupant restraint. Furthermore, the disposition of the various components of the improved safety belt system provides for a highly compact arrangement with no interference with the vehicle passenger compartment and the obviation of any projecting or useful space consuming components with a resulting highly attractive appearance.

BRIEF DESCRIPTION OF THE DRAWINGS

FIG. 1 is a front perspective view of the seat portion of a safety belt system embodying the present invention;

FIG. 2 is a fragmentary front elevational view of the safety belt and guide roller portion thereof; and FIG. 3 is a front perspective view of one of the guide roller assemblies.

DESCRIPTION OF THE PREFERRED EMBODIMENT

Referring now to the drawing which illustrates a preferred embodiment of the present invention, the reference numeral 1 generally designates the seat portion and reference numeral 2 the back portion of a vehicle seat, for example, in an automobile or aircraft, the seat being firmly secured to the vehicle. The back portion is of generally conventional configuration, extending above the normal occupants shoulder level and having housing cavities between the front and rear faces thereof.

Formed in the lower corners of back portion 2 shortly above the level of seat portion 1 are a pair of passageway openings 3 and 4 and in the upper portion of back portion 2 a pair of passageway openings 21 and 22 which are at about or slightly above the shoulder level of the normal seat occupant and are transversely separated and spaced inwardly from the side edges of seat back portion 2. The opening 3, 4, 21 and 22 are each of a dimension to permit the free passage therethrough of a safety belt web and are preferably suitably reinforced. The seat back portion is reinforced by a frame which forms a securely attached part of the seat and is provided with a plurality of firm mounting positions including lower cross member 9 at the level of openings 3 and 4 and upper cross member 27 just above the level of openings 21 and 22.

Securely hung from the lower cross member directly behind the openings 3 and 4 and disposed within seat back portion 2 are a pair guide roller members 7 and 8. As shown in FIG. 3, each of the roller members 7 and 8 comprises a bracket including a flat cross base and transversely spaced parallel side plates between which the roller, per se, is journalled for free rotation, the roller having tapered peripheral flanges. There are provided a pair of lap belts 5 and 6 formed of belt webbing, the belts extending through respective seat back openings 3 and 4. An anchoring link 11 is secured to the inner free end of belt 5 such as by engagement with a loop formed at the end of belt 5 and the link 11 is secured to a mounting position in the seat back portion 2 transversely inwardly of and above roller member 7. Similarly, an anchoring link 13 is secured to the inner free end of belt 6 in the manner of securement of link 11 and the link 13 is secured to a mounting position in the seat back portion 2 transversely inwardly and above roller member 8. A buckle 12 is secured to the outer front end of belt 6 and a mating tongue member is secured to the outer front end of belt 5 to permit the separable coupling of the belts. It should be noted that roller members 5 and 6 are so oriented that the belts 7 and 8 extend about the rollers which reverse the directions of the belts as they extend from the respective rollers so that in normal use they extend at approximately a similar angle to the horizontal, the rollers forming an acute angle to the vertical.

A pair of roller members 25 and 26 whose axes are approximately horizontal, are of similar construction to roller members 7 and 8 and are securely hung on upper cross member 27 behind and directly above openings 21 and 22 and disposed within seat back portion 2. A first harness belt 23 has its front end secured to the buckle tongue 12 and extends through opening 21 about the roller 25 and terminates at its rear in an anchoring link 28 similar to link 11. The anchoring link 28 is secured to a mounting position in the seat back portion 2 approximately midway between the levels of openings 21 and 3 and in about vertical alignment with roller member 25. A second harness belt 24 has its front end secured to the end of belt 6 proximate buckle 12 and extends through opening 22 and terminates at its rear in an attached anchoring link 29. The anchoring link 29 is secured to a mounting position in back seat portion 2 approximately midway between the levels of opening 4 and 22 and in about vertical alignment with opening 22.

The operation of the safety belt system is clear from the above description, the harness and lap belts being secured about a seated occupant merely by coupling the tongue 10 and buckle 12 after the occupant has inserted his arms between each pair of seat and harness belts. The numerous advantages of the improved belt system have been set forth above.

While there have been described and illustrated preferred embodiments of the present invention, it is apparent that numerous alterations, omissions and additions may be made without departing from the spirit thereof. For example, instead of anchoring the inner ends of the belts directly to the seat back one or more of the belts may be connected to the rear mounting positions by retractor reels which may be of the automatic or inertia locking types and instead of the preferred double harness lap belt system a three point belt system may be employed.

I claim:

1. In combination with a vehicle seat having a back portion including a front face and a reinforcing frame provided with upper and lower cross members extending for substantially the width of said back portion, a guide roller mounted on each of said cross members proximate a side of said back portion, a pair of seat belts extending rearwardly from forward of said seat back portion about respective guide rollers and fixedly anchored at their rear ends to stationary points on said seat back portion remote from said respective guide rollers, the front ends of said belts being interconnected, and a separable coupling member attached to the front portion of at least one of said belts.

2. The combination of claim 1 wherein said belts extend rearwardly toward said respective guide rollers in first directions and extend from said guide rollers toward said anchoring points in a second directions opposite to said respective first directions.

3. The combination of claim 2 wherein said back portion includes a front face, having openings therein, said guide rollers being disposed behind said front face proximate said openings and said belts extend through said openings.

4. The combination of claim 3 wherein one of said openings is disposed proximate a lower corner of said back portion front face and said anchor point is transversely inwardly spaced from said opening.

5. The combination of claim 3 wherein one of said openings is disposed in the upper part of said back portion front face, transversely offset from the medial vertical axis thereof and at about the shoulder level of a seat occupant and said anchor point is remotely spaced from and below said opening.

6. The combination of claim 3 including a first opening being disposed proximate a lower corner of said front face and a second opening being disposed in the upper part of said front face transversely offset from the medial vertical axis thereof, one of said rollers being disposed proximate each of said openings, one of said belts extending through said first opening about a respective roller to a transversely inwardly spaced anchor point, the other of said belts extending through said second opening and about a respective roller to an anchor point disposed below said second opening and the front ends of said belts being interconnected.

7. The combination of claim 6 wherein said front face has a second pair of openings symmetrically disposed about the vertical medial axis of said front face relative to said first and second openings, a second pair of rollers disposed behind said front face proximate said second pair of openings, a third belt extending through the lower of said second pair of openings about a respective roller to transversely inwardly spaced anchor point, a fourth belt extending through the upper of said second pair of openings about a respective roller and then downwardly to a vertically spaced anchor point, said third and fourth belts being interconnected at their forward ends, and a second coupling member attached to the end portions of said third and fourth belts and releasably engageable with said first coupling member.

* * * * *